(12) United States Patent
Mukherjee

(10) Patent No.: US 11,641,366 B2
(45) Date of Patent: May 2, 2023

(54) CENTRALIZED TOOL FOR IDENTIFYING AND BLOCKING MALICIOUS COMMUNICATIONS TRANSMITTED WITHIN A NETWORK

(71) Applicant: BANK OF AMERICA CORPORATION, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 193 days.

(21) Appl. No.: 17/146,084

(22) Filed: Jan. 11, 2021

(65) Prior Publication Data

US 2022/0224699 A1 Jul. 14, 2022

(51) Int. Cl.
*H04L 9/40* (2022.01)
*G06N 3/044* (2023.01)

(52) U.S. Cl.
CPC ......... *H04L 63/1416* (2013.01); *G06N 3/044* (2023.01); *H04L 63/145* (2013.01); *H04L 63/1483* (2013.01)

(58) Field of Classification Search
CPC .............. H04L 63/145; H04L 63/1416; H04L 63/1483; H04L 63/1425; H04L 63/1408; H04L 63/14; G06N 3/0445
USPC ......................................................... 726/23
See application file for complete search history.

(56) References Cited

U.S. PATENT DOCUMENTS

| | | | |
|---|---|---|---|
| 7,137,145 B2 | 11/2006 | Gleichauf | |
| 7,409,715 B2 | 8/2008 | Gariador et al. | |
| 7,725,936 B2 | 5/2010 | Banerjee et al. | |
| 7,757,283 B2 | 7/2010 | Robert et al. | |
| 8,079,030 B1 | 12/2011 | Satish et al. | |
| 8,087,085 B2 | 12/2011 | Hu et al. | |
| 8,418,252 B2 | 4/2013 | Akyol et al. | |
| 8,443,446 B2 | 5/2013 | Lamastra et al. | |
| 8,479,290 B2 | 7/2013 | Viswanathan et al. | |
| 8,621,551 B2 | 12/2013 | Zhang et al. | |
| 8,689,328 B2 | 4/2014 | Ormazabal et al. | |
| 8,689,333 B2 | 4/2014 | Aziz | |

(Continued)

OTHER PUBLICATIONS

Maharaj Mukherjee; "System and Method for Securing a Network Against Malicious Communications Through Peer-Based Cooperation;" U.S. Appl. No. 17/146,145, filed Jan. 11, 2021.

*Primary Examiner* — Tae K Kim

(57) ABSTRACT

An apparatus includes a memory and a processor. The memory stores a first list of applications that includes a first application and a second list of applications that includes a second application. Each application of the first list is assigned to a first trust level, indicating that a probability that the application is malicious is less than a lower threshold. Each application of the second list is assigned to a second trust level, indicating that a probability that the application is malicious is greater than the lower threshold. The processor determines that the second application transmitted a communication destined for the first application, and that the first and second applications are assigned to different trust levels. In response, the processor determines that a probability that the transmitted communication is malicious is greater than a threshold and prevents the communication from reaching the computer system of the first application.

17 Claims, 7 Drawing Sheets

(56) References Cited

U.S. PATENT DOCUMENTS

| | | |
|---|---|---|
| 8,776,229 B1 | 7/2014 | Aziz |
| 9,407,644 B1 | 8/2016 | Cheng et al. |
| 9,674,206 B2 | 6/2017 | Jiang |
| 9,838,416 B1 | 12/2017 | Aziz |
| 10,171,490 B2 | 1/2019 | Ranum et al. |
| 10,200,384 B1 | 2/2019 | Mushtaq et al. |
| 10,334,083 B2 | 6/2019 | Katmor et al. |
| 10,382,480 B2 | 8/2019 | Reddy et al. |
| 10,419,454 B2 | 9/2019 | El-Moussa et al. |
| 10,469,507 B2 | 11/2019 | El-Moussa et al. |
| 10,581,915 B2 | 3/2020 | Scherman et al. |
| 10,673,869 B2 | 6/2020 | El-Moussa et al. |
| 2006/0128406 A1 | 6/2006 | Macartney |
| 2008/0301810 A1 | 12/2008 | Lehane et al. |
| 2015/0067853 A1 | 3/2015 | Amrutkar et al. |
| 2015/0358343 A1* | 12/2015 | Segal .................. H04L 63/1425 726/23 |
| 2016/0047662 A1 | 2/2016 | Ricci |
| 2016/0212160 A1 | 7/2016 | Jiang |
| 2016/0359695 A1* | 12/2016 | Yadav .................... H04L 43/04 |
| 2017/0118236 A1 | 4/2017 | Devi Reddy et al. |
| 2017/0134405 A1 | 5/2017 | Ahmadzadeh et al. |
| 2018/0131705 A1* | 5/2018 | Samadani ............. H04L 43/026 |
| 2019/0132344 A1 | 5/2019 | Lem et al. |
| 2019/0197237 A1 | 6/2019 | Aguayo Gonzalez et al. |
| 2019/0260780 A1 | 8/2019 | Dunn et al. |
| 2019/0278909 A1 | 9/2019 | Saxe |
| 2020/0007529 A1* | 1/2020 | Bahrenburg ............ H04L 63/08 |
| 2020/0120111 A1* | 4/2020 | Gangadharan ........ H04L 63/162 |
| 2020/0304521 A1 | 9/2020 | Jiang |
| 2020/0336461 A1 | 10/2020 | Jordan |
| 2020/0351281 A1 | 11/2020 | Ruvio et al. |
| 2020/0412746 A1* | 12/2020 | Regentov .............. H04L 63/145 |
| 2021/0168164 A1* | 6/2021 | El-Moussa .......... H04L 63/1466 |
| 2021/0264021 A1* | 8/2021 | Kandel .................. G06F 21/604 |
| 2021/0342742 A1* | 11/2021 | G Rao .................... G06F 21/57 |

* cited by examiner

CENTRALIZED TOOL FOR IDENTIFYING AND BLOCKING MALICIOUS COMMUNICATIONS TRANSMITTED WITHIN A NETWORK

TECHNICAL FIELD

The present disclosure relates generally to network security in a system involving multicomputer data transferring, and more particularly, to a centralized tool for identifying and blocking malicious communications transmitted within a network.

BACKGROUND

Enterprise systems often include large numbers of applications that communicate with one another in order to cooperatively execute tasks within the systems. Given such communication, if an application within a system becomes infected with malware and reconfigured to transmit malicious communications, such communications may compromise a large number of other applications within the system.

SUMMARY

According to an embodiment, an apparatus includes a memory and a hardware processor communicatively coupled to the memory. The memory stores a first list of applications, a second list of applications, and a communication log. The first list of applications includes a first application. Each application of the first list of applications is assigned to a first trust level of a set of trust levels. The assignment of the application to the first trust level indicates that a probability that the application is malicious is less than a lower threshold. The second list of applications includes a second application. Each application of the second list of applications is assigned to a second trust level of the set of trust levels. The assignment of the application to the second trust level indicates that a probability that the application is malicious is greater than the lower threshold. Each application of the first list of applications and the second list of applications belongs to a set of applications, each of which is installed on a computer system of a set of computer systems. Each computer system of the set of computer systems is located on a network. The communication log includes information identifying communications that have occurred over the network. The hardware processor determines that the second application transmitted a communication destined for the first application. The processor also determines that the first application and the second application are assigned to different trust levels of the set of trust levels. In response to determining that the first application and the second application are assigned to different trust levels, and prior to the communication destined for the first application reaching the computer system of the first application, the processor determines, based at least in part on the communications identified in the communication log, that a probability that the communication destined for the first application is malicious is greater than a threshold. In response to determining that the probability that the communication destined for the first application is malicious is greater than the threshold, the processor prevents the communication destined for the first application from reaching the computer system of the first application.

According to another embodiment, a first computer system that is configured to execute a first application includes a memory and a hardware processor. The memory stores a first list of trusted applications, a first list of malicious applications, and a list of peer applications. Each application of the first list of trusted applications is associated with a probability that the application is malicious that is less than a lower threshold. Each application of the first list of malicious applications is associated with a probability that the application is malicious that is greater than an upper threshold. The list of peer applications includes a first peer application installed on a second computer system. The second computer system includes a second memory that stores a second list of malicious applications. Each application of the second list of malicious applications is associated with a probability that the application is malicious that is greater than the upper threshold. The hardware processor determines that a second application is attempting to transmit a first communication to the first application. The hardware processor also determines that the second application is not included in any of the first list of trusted applications and the first list of malicious applications. In response to determining that the second application is not included in any of the first list of trusted applications and the first list of malicious applications, the hardware processor identifies the first peer application in the list of peer applications. The hardware processor additionally transmits a message to the first peer application inquiring about the second application. Transmitting the message to the first peer application includes transmitting the message to the second computer system. The hardware processor further receives a response from the first peer application indicating that the second application is included in the second list of malicious applications. In response to receiving the response indicating that the second application is included in the second list of malicious applications, the hardware processor refuses the first communication.

Certain embodiments provide one or more technical advantages. As an example, an embodiment helps to secure an organization's internal network against malware. As another example, an embodiment applies a recurrent neural network that has been trained to identify communication patterns indicative of the presence of malicious applications within the system. As another example, an embodiment helps to ensure that an internal network is protected from malicious communications even if one or more subsystems within the system (including, for example, a centralized system configured to monitor communications within the system) fails, by enabling individual applications operating within the system to cooperate with one another to assess the trustworthiness of communications transmitted within the system. As a further example, an embodiment conserves computational resources by relying on cooperation amongst a group of trusted, peer applications within an internal network to identify malicious applications/communications, rather than having each application store a complete set of information of the trustworthiness of all of the (potentially millions) of applications installed in the system. The system described in the present disclosure may particularly be integrated into a practical application of a network security system designed to protect an organization's internal network from both the infiltration and spread of malware within the system.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1A:
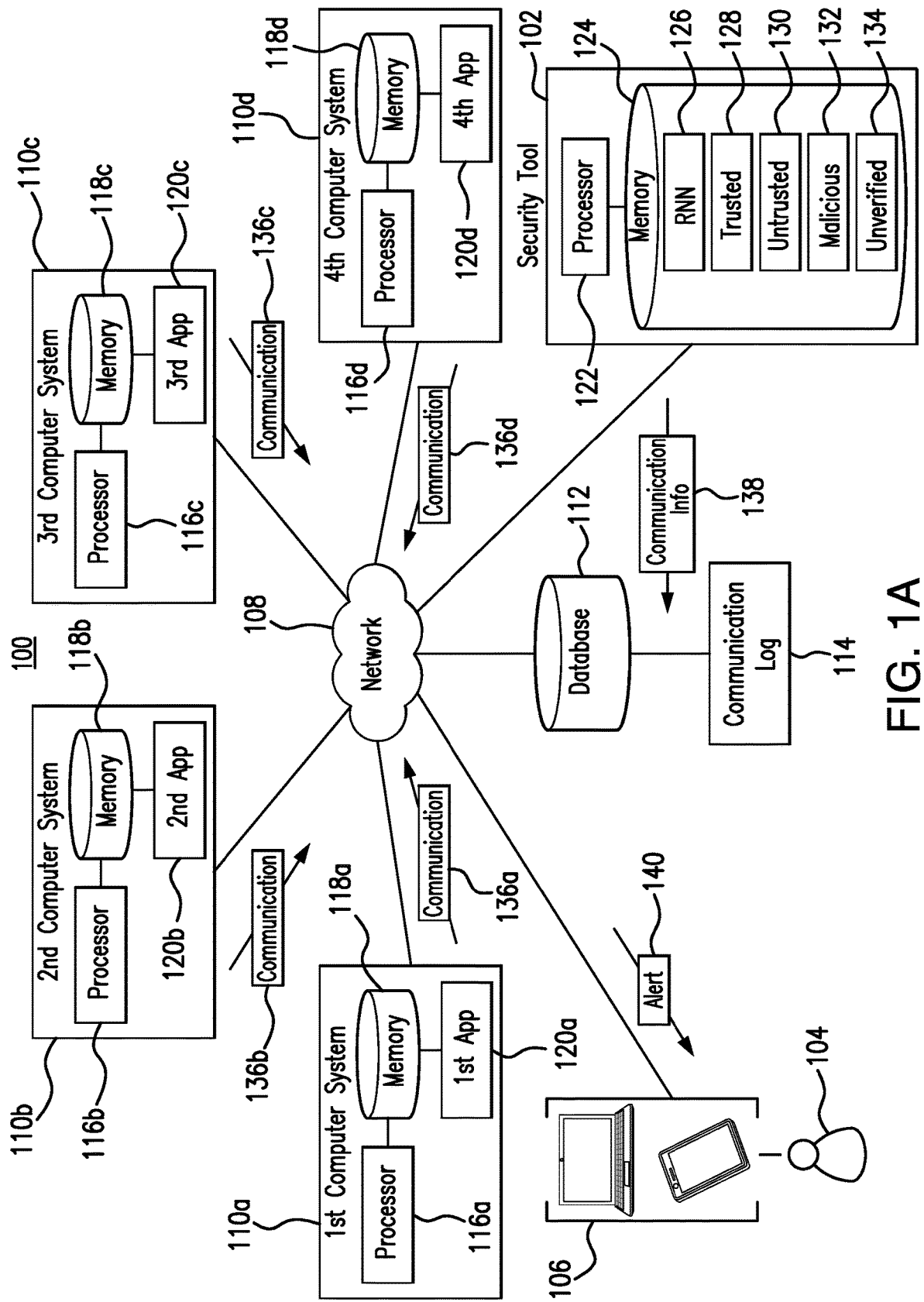
FIG. 1A illustrates an example network security system that relies on a centralized tool to monitor for and protect against malicious communications transmitted to subsystems located on an internal network.

This disclosure contemplates a network security system that includes features designed to protect an organization's internal subsystems from malicious communications transmitted to applications installed on those subsystems. Such communications may include both malicious communications originating from sources external to the organization's internal network as well as malicious communications originating from other applications operating within the internal network that have been infected with malware but may not yet have been identified and/or disinfected by a system administrator. The disclosed system dynamically groups those applications that have previously transmitted and/or attempted to transmit communications over the organization's internal network into a set of trust levels, based on the applications' historical communication patterns. For example, the system may assign a first application to a trusted group, where the application's historical communications indicate that there is a high probability that the application is not malicious. Similarly, the system may assign a second application to a malicious group, where the application's historical communications indicate that there is a high probability that the application has been infected with malware or is otherwise malicious, and the system may assign a third application to an untrusted group, where the application's historical communications indicate that the probability that the application is malicious is large enough so that the application should not be assigned to the trusted group, but not so large that the application should be assigned to the malicious group. The disclosed system uses the assigned trust levels to evaluate incoming communications. For example, the system may allow a communication transmitted by a fourth application to reach a fifth application, where both the fourth and fifth applications are assigned to the trusted group. On the other hand, the system may prevent a communication transmitted by a sixth application from reaching a seventh application, where the sixth application is assigned to the malicious group and the seventh application is assigned to the trusted group.

In certain embodiments, the network security system includes a centralized security tool that operates within an organization's internal network to perform the above-described tasks of: (1) grouping applications into the set of trust levels; (2) using the assigned trust levels to evaluate each communication transmitted to/from a given application located on the organization's internal network; and (3) preventing those communications identified as likely malicious from reaching their destinations. The centralized tool is configured to maintain a log of the historical communications attempted/completed within the system, and to analyze this log to determine whether updates to the assigned trust levels should be made. As an example, in certain embodiments, the tool applies a recurrent neural network to the historical communication log to identify patterns within the historical communications that are indicative of the presence of malware in certain applications, and updates the list of malicious applications to include such applications. The use of a centralized security tool to evaluate the trustworthiness of applications that are transmitting communications over an internal network is described in further detail below, in the discussion of FIGS. 1A through 2B.

In some embodiments, each application within the system is configured to maintain its own local lists of trusted, untrusted, and/or malicious applications, and to use these local lists to (1) evaluate the communication requests it receives from other applications and (2) allow/deny such requests based on these evaluations. For example, in response to receiving a communication request from an application included in its list of trusted applications, a given application may decide to accept the request and receive communications from the trusted application. On the other hand, in response to receiving a communication request from an application included in its list of malicious application, the given application may deny the request and block any communications transmitted to it by the malicious application.

Because there may be millions of applications located within an organization's internal network, in certain embodiments, the individual lists maintained locally by each application are not exhaustive; rather, the lists may include only those applications that communicate and/or attempt to communicate on a regular basis with the application that maintains the lists. Accordingly, in order to enable each application to evaluate communications originating from other applications that are not included in its locally maintained lists, each application may also store a list of peer applications with which to consult when receiving communication requests from unknown applications. For example, consider a situation in which a first application receives a communication request from a second application. In response to determining that the second application is not included in any of the lists of trusted, untrusted, and/or malicious applications it maintains, the first application may send a message to each application included in its list of peer applications requesting information about the second application. If the first application receives a response from one of its peer applications indicating that the second application is likely malicious, the first application may deny the second application's communication request. On the other hand, if the only responses received from the peer applications indicate that the second application is likely trustworthy, the first application may accept the communication request. The use of such peer-based cooperation to evaluate the trustworthiness of applications within the system is described in further detail below, in the discussion of FIGS. 3 through 4B.

This disclosure contemplates that either the centralized security tool, the peer-based cooperation method, or both may be incorporated into an organization's internal network/systems, to help protect the organization from malware and/or malicious communications. As an example, in certain embodiments, the trustworthiness groupings generated by the centralized security tool may be used to initialize the local trustworthiness lists maintained by each of the applications located within the internal network. As another example, in certain embodiments, the peer-based cooperation method may be used to evaluate communications transmitted by applications located within the internal network, while the centralized security tool may be used to evaluate communications transmitted by applications located outside of the internal network and destined for applications located within the internal network.

Embodiments of the present disclosure and its advantages may be understood by referring to FIGS. 1A through 4B of the drawings, like numerals being used for like and corresponding parts of the various drawings.

I. Centralized Tool for Identifying and Blocking Malicious Communications a. System Overview FIG. 1A illustrates an example network security system 100 that includes user(s) 104, device(s) 106, network 108, subsystems 110a through 110d, database 112, and security tool 102. Each subsystem 110a through 110d includes one or more applications 120a through 120d. Generally, security tool 102 is configured to generate and maintain a set of trust level groupings 128 through 134 into which applications 120a through 120d are assigned, according to the likelihood that each application is infected with malware or is otherwise malicious (e.g., is being controlled by an application that is infected with malware). For example, as illustrated in FIG. 1A, security tool 102 is configured to generate and maintain a set of four different trust level groupings—a trusted grouping 128, an untrusted grouping 130, a malicious grouping 132, and an unverified grouping 134. Trusted grouping 128 includes those applications of applications 120a through 120d that security tool 102 has determined are likely not malicious (e.g., the probability that a given application assigned to trusted grouping 128 is malicious is less than a lower threshold). Malicious grouping 132 includes those applications of applications 120a through 120d that security tool 102 has determined are likely malicious (e.g., the probability that a given application assigned to malicious grouping 132 is malicious is greater than an upper threshold). Untrusted grouping 130 includes those applications of applications 120a through 120d that security tool 102 has determined may be malicious (e.g., the probability that a given application assigned to untrusted grouping 130 is malicious is greater than the lower threshold, but less than the upper threshold). Unverified grouping 134 includes those applications of applications 120a through 120d for which security tool 102 has not yet determined a likelihood that the application is malicious. For example, unverified grouping 134 may include newly installed applications for which security tool 102 does not yet have enough information to assess the trustworthiness of the applications. Security tool 102 is also configured to monitor communications 136a through 136d transmitted over network 108, block potentially malicious communications as determined, for example, based on the trust level groupings 128 through 134 that have been assigned to the sending and receiving applications, and update the groupings 128 through 134 assigned to applications 120a through 120d based on patterns identified in the historical communications transmitted and/or received by these applications. The manner by which security tool 102 performs these tasks is described in further detail below, and in the discussion of FIGS. 2A and 2B.

Devices 106 are used by users 104 located on network 108 to communicate with security tool 102 and/or subsystems 110a through 110d. As an example, devices 106 may be used by users 104 to receive warnings and/or alerts 140 transmitted by security tool 102 and/or subsystems 110a through 110d. For example, in response to determining that a communication (e.g., communication 136a) is likely malicious and/or that an application (e.g., application 120a) is likely malicious, security tool 102 may be configured to transmit a message 140 to device 106 alerting a system administrator 104 to the potentially malicious communication and/or application. In response to receiving message 140, system administrator 104 may further investigate to determine whether any of subsystems 110a through 110d have been compromised by malware and identify/implement any remediation steps that may need to be taken.

Devices 106 include any appropriate device for communicating with components of system 100 over network 108. For example, devices 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between such components. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. For example, in certain embodiments, a first subset of subsystems 110a through 110d are located on an internal network 108, while a second subset of subsystems 110a through 110d are located on an external network 108. In such embodiments, subsystems of the first subset of subsystems 110a through 110d may transmit communications 136 to one another over internal network 108, while communications 136 transmitted by the second subset of subsystems 110a through 110d and destined for subsystems of the first subset of subsystems 110a through 110d may originate on the external network 108. In some embodiments, communications 136 originating on the external network may pass through a firewall or other security device before entering the internal network 108.

As illustrated in FIG. 1A, system 100 includes a set of subsystems 110a through 110d that are configured to communicate with one another. While illustrated in FIG. 1A as including four subsystems 110a through 110d, system 100 may include any number of subsystems 110. Subsystems 110a through 110d include any systems capable of generating content for communications, sending communications, receiving communications, and/or performing any other suitable functions. For example, as illustrated in FIG. 1A, first subsystem 110a is a system configured to generate and transmit communication 136a, and/or to receive communications 136b, 136c, and/or 136d; second subsystem 110b is a system configured to generate and transmit communication 136b, and/or to receive communications 136a, 136c, and/or 136d; third subsystem 110c is a system configured to generate and transmit communication 136c, and/or to receive communications 136a, 136b, and/or 136d; and fourth subsystem 110d is a system configured to transmit communication 136d and/or to receive communications 136a, 136b, and/or 136c. Each of communications 136a through 136d may be any type of communication and may include any type of information. For example, communications 136a through 136d may include text, source code, executable code, spreadsheets, images, videos, audio files, binary files, HTML, files, any combination of the preceding, or any other suitable form of data.

The communications transmitted by subsystems 110a through 110d may be generated by applications installed on those subsystems. For example, as illustrated in FIG. 1A, first application 120a, which is installed on first subsystem 110a, may generate communication 136a; second application 120b, which is installed on second subsystem 110b, may generate communication 136b; third application 120c, which is installed on third subsystem 110c, may generate communication 136c; and fourth application 120d, which is installed on fourth subsystem 110d, may generate communication 136d. While illustrated in FIG. 1A as each subsystem 110a through 110d including a single application of the set of applications 120a through 120d, this disclosure contemplates that each subsystem 110a through 110d may include any number of applications 120. Furthermore, in addition to communications 136a through 136d being transmitted from one subsystem to another subsystem (e.g., from subsystem 110a to subsystem 110b), as illustrated in FIG. 1A, in certain embodiments, communications may be transmitted between applications installed on the same subsystem. For example, a first application 136a, installed on first subsystem 110a, may transmit a communication 136a to a second application 136a that is also installed on first subsystem 110a.

In certain embodiments, one or more of applications 120a through 120d and/or subsystems 110a through 110d may be infected with malware. Malware includes any software that is intended to cause harm (directly or indirectly) to any of subsystems 110a through 110d in system 100. For example, certain types of malware may be designed to (1) disrupt and/or prevent the operation of the subsystem in which it is installed, (2) access private, sensitive, or otherwise secure information stored within system 100, (3) perform illegal acts, and/or (4) perform any other undesirable acts. This disclosure contemplates that one or more applications 120a through 120d and/or subsystems 110a through 110d may be infected with any type of malware including, for example, computer viruses, worms, trojans, ransomware, spyware, adware, any combination of the preceding, and/or any other type of malicious software.

Any application of applications 120a through 120d that is infected with malware may generate (either directly or indirectly) malicious communications 136. As an example, if application 120a is infected with malware, this malware may cause application 120a to directly generate malicious communications 136a. In certain embodiments, these communications may themselves include malware and be used to propagate the malware throughout system 100. In some embodiments, these communications may include instructions directing other applications to perform malicious activities. For example, the communications may correspond to phishing attempts.

Each application that is installed in a given subsystem may correspond to computer readable instructions that are stored in the memory of the subsystem and executed by one or more processors within the subsystem. For example, as illustrated in FIG. 1A, first application 120a is installed in memory 118a and executed by processor 116a of first subsystem 110a; second application 120b is installed in memory 118b and executed by processor 116b of second subsystem 110b; third application 120c is installed in memory 118c and executed by processor 116c of third subsystem 110c; and fourth application 120d is installed in memory 118d and executed by processor 116d of fourth subsystem 110d. Applications 120a through 120d may be any applications configured, when executed by processors 116a through 116d, to generate communications 136, transmit communications 136, receive communications 136, and/or perform any other suitable functions.

Processors 116a through 116d of subsystems 110a through 110d are any electronic circuitry, including, but not limited to central processing units (CPUs), graphics processing units (GPUs), microprocessors, application specific integrated circuits (ASIC), application specific instruction set processor (ASIP), and/or state machines, that communicatively couple to memories 118a through 118d and control the operations of subsystems 110a through 110d. Processors 116a through 116d may be 8-bit, 16-bit, 32-bit, 64-bit or of any other suitable architecture. Processors 116a through 116d may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 116a through 116d may include other hardware and software that operates to control and process information. Processors 116a through 116d execute software stored on memory to perform any of the functions described herein. Processors 116a through 116d each control the operation and administration of their corresponding subsystem 110a through 110d by processing information received from security tool 102, device(s) 106, network 108, any of the other subsystems 110a through 110d, database 112, and/or the corresponding memory of memories 118a through 118d. Processors 116a through 116d may be programmable logic devices, microcontrollers, microprocessors, any suitable processing devices, or any suitable combination of the preceding. Processors 116a through 116d are not limited to single processing devices and may encompass multiple processing devices.

Memories 118a through 118d of subsystems 110a through 110d may store, either permanently or temporarily, data, operational software, or other information for the corresponding processor of processors 116a through 116d. Memories 118a through 118d may include any one or a combination of volatile or non-volatile local or remote devices suitable for storing information. For example, memories 118a through 118d may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in each of memories 118a through 118d, a disk, a CD, or a flash drive. In particular embodiments, the software may include an application executable by the corresponding processor 116a through 116d to perform one or more of the functions described herein. For example, as described above, each of memories 118a through 118d may store applications 120a through 120d, for execution by the corresponding processor 116a through 116d.

As seen in FIG. 1, security tool 102 includes a processor 122 and a memory 124. This disclosure contemplates processor 122 and memory 124 being configured to perform any of the functions of security tool 102 described herein. Generally, security tool 102 is configured to: (1) group applications 120a through 120d into a set of trust level groupings 128 through 134; (2) monitor and log communications 136a through 136d transmitted over network 108 by applications 120a through 120d; (3) determine whether any of communications 136a through 136d are likely malicious, based on the trust level groupings 128 through 134 assigned to the transmitting and receiving applications and/or any patterns identified in the historical communications logged in communication log 114; (4) prevent those communications of communications 136a through 136d that have been identified as likely malicious from reaching their destinations; and (5) update the assigned trust level groupings 128 through 134 based on an analysis of the historical communications transmitted within system 100 and stored in communication log 114. These functions of security tool 102 are described in further detail below, in the discussion of FIGS. 2A and 2B.

Processor 122 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 124 and controls the operation of security tool 102. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware and software that operates to control and process information. Processor 122 executes software stored on memory to perform any of the functions described herein. Processor 122 controls the operation and administration of security tool 102 by processing information received from device(s) 106, network 108, subsystems 110a through 110d, database 112, and/or memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data, operational software, or other information for processor 122. Memory 124 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 124, a disk, a CD, or a flash drive. In particular embodiments, the software may include an application executable by processor 122 to perform one or more of the functions described herein.

Figure 1B:
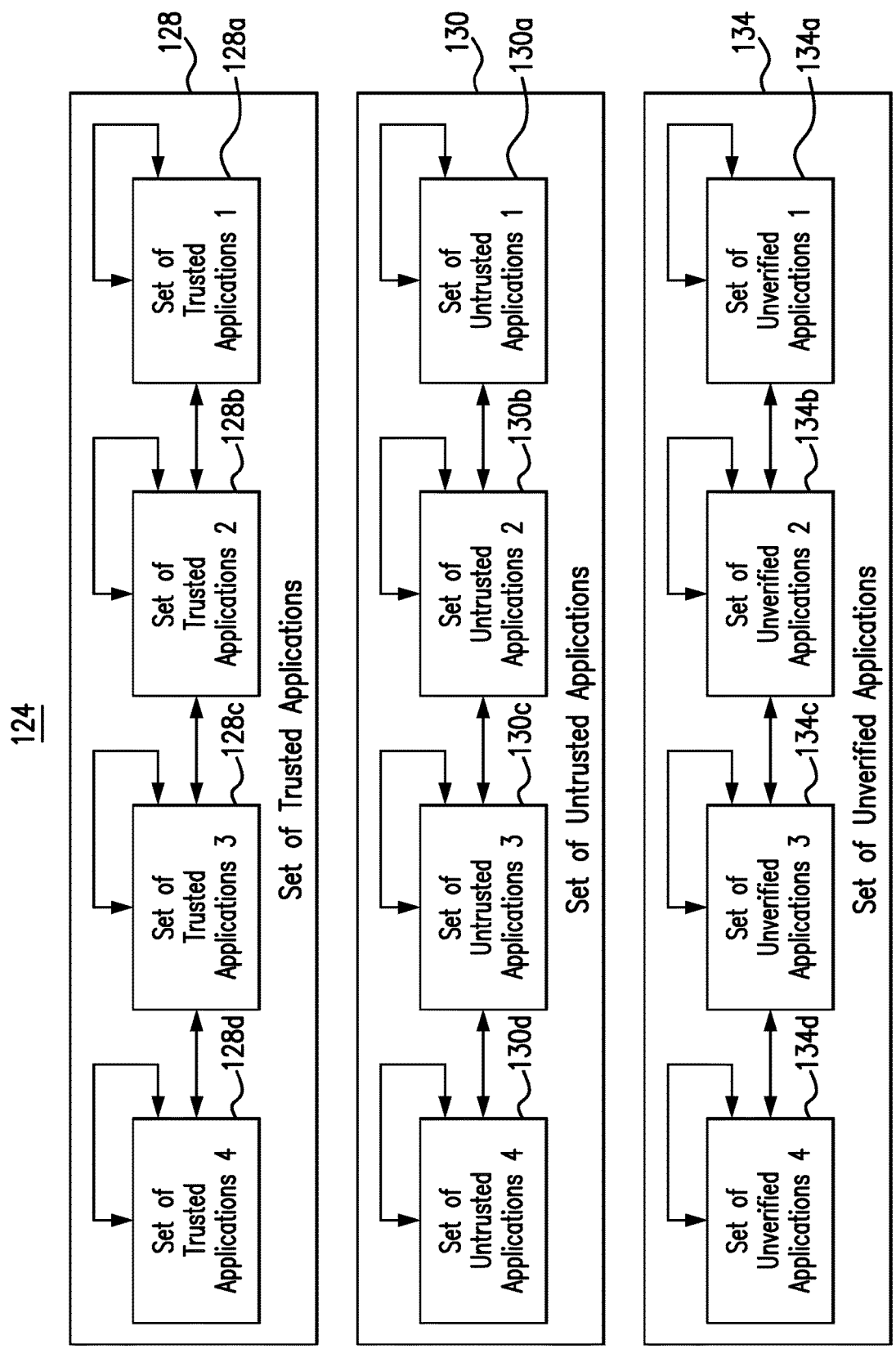
FIG. 1B illustrates an example of the trustworthiness classifications to which the network security tool of the system of FIG. 1A may assign to applications installed in the system.

As illustrated in FIG. 1A, memory 124 may also store, a list of trusted applications in trusted grouping 128, a list of untrusted applications in untrusted grouping 130, a list of malicious applications in malicious grouping 132, and/or a list of unverified applications in unverified grouping 134. As described above, each of these groupings may be associated with a given probability range that the applications assigned to the grouping are malicious. For example, each application 120 assigned to trusted grouping 128 may be associated with a probability that the application is malicious that is less than a lower threshold; each application 120 assigned to untrusted grouping 130 may be associated with a probability that the application is malicious that is greater than the lower threshold, but less than an upper threshold; and each application 120 assigned to malicious grouping 132 may be associated with a probability that the application is malicious that is greater than the upper threshold. Applications 120 may be assigned to unverified grouping 134 when security tool 102 does not yet have enough information about the applications to assign them to any of the other groupings. While illustrated in FIG. 1A as storing a set of four different trust level groupings 128 through 134, this disclosure contemplates that memory 124 of security tool 102 may include any number of trust level groupings. As an example, in certain embodiments, and as illustrated in FIG. 1B, each of trusted grouping 128, untrusted grouping 130, and/or unverified grouping 134 may include a set of tiers. For example, trusted grouping 128 may include tiers 128a through 128d, untrusted grouping 130 may include tiers 130a through 130d, and unverified grouping 134 may include tiers 134a through 134d. Each tier may be associated with its own probability range that the applications assigned to the subgrouping are malicious. For example, applications assigned to trusted grouping 128 may be further assigned to first tier 128a when they are associated with the lowest probabilities of being malicious of the probability range assigned to trusted grouping 128, while applications assigned to second tier 128b through fourth tier 128d may be associated within increasingly higher probabilities of being malicious within the trusted grouping. Similarly, applications assigned to untrusted grouping 130 may be further assigned to first tier 130a when they are associated with the lowest probability of being malicious of the probability range assigned to untrusted grouping 130, while applications assigned to second tier 130b through fourth tier 130d may be associated with increasingly higher probabilities of being malicious within the untrusted grouping; and applications assigned to unverified grouping 134 may be further assigned to first tier 134a when they are associated with the lowest probability of being malicious of the probability range assigned to malicious grouping 134, while applications assigned to second tier 134b through fourth tier 134d may be associated with increasingly higher probabilities of being malicious within the unverified grouping. While illustrated in FIG. 1B as including four tiers within each grouping 128, 130, and 134, each grouping may include any number of trust level tiers.

As illustrated in FIG. 1A, memory 124 may also store recurrent neural network (RNN) 126. Security tool 102 may use RNN 126 to determine (1) whether to allow/deny a given communication 136, and/or (2) into which trust level groupings of groupings 128 through 134 applications 120a through 120d should be assigned. RNN 126 may be trained to make such determinations based on the historical communications that have been transmitted/received within system 100 and stored in communication log 114 in database 112. For example, in certain embodiments, communication log 114 stores information 138 about the historical communications that have occurred within system 100 including, for each communication, (1) an indication of the application that initiated the communication, and (2) an indication of the application that received the communication and/or was the intended recipient of the communication. For a portion of the communications identified in communication log 114, the log may also include an indication of whether or not the communication was malicious and/or whether or not the transmitting and/or receiving application was infected with malware or otherwise malicious at the time of the communication. Such indications may be added to communication log 114 at any time and in any manner, after the discovery and/or confirmation of a malicious communication and/or malicious application. For example, a system administrator may determine that malware was installed in a given application 120a at a given time, and update the information stored in communication log 114 to indicate this fact. RNN 126 may be trained based on these indications of maliciousness, to identify patterns within communication log 114 that tend to be indicative of either a malicious or trustworthy application. The use of RNN 126 is described in further detail below, in the discussion of FIGS. 2A and 2B. While described throughout this disclosure as security tool 102 applying a recurrent neural network 126 to identify malicious communications and classify applications 120a through 120d into different trust level groupings 128 through 134, any machine learning algorithm that has been adapted and trained to perform these tasks may be used.

Database 112 is any storage location accessible by security tool 102 and configured to store communication log 114. Communication log 114 may include any information that may be used by security tool 102 to identify patterns within the historical communications that have occurred within system 100 and that are indicative of the trustworthiness (e.g., probability of malware infection) of applications 120a through 120d. For example, for each communication included in communication log 114, the log may include information about the transmitting application, the sending application, the time at which the communication was sent, and/or any other information that may be used by security tool 102.

Modifications, additions, or omissions may be made to the systems described herein without departing from the scope of the invention. For example, system 100 may include any number of users 104, devices 106, networks 108, subsystems 110a through 110d, databases 112, and applications 120a through 120d. The components may be integrated or separated. Moreover, the operations may be performed by more, fewer, or other components. Additionally, the operations may be performed using any suitable logic comprising software, hardware, and/or other logic.

b. Method for Centralized Identification of Malicious Communications

As described above, security tool 102 may be used to evaluate communications 136a through 136d transmitted within system 100 and to adjust the trust level groupings 128 through 134 assigned to applications 120a through 120d, based on patterns identified in the communications. Security tool 102 may be configured to use RNN 126 to identify these patterns, in conjunction with the following set of rules:

(1) Any communications 136a through 136d that occur among applications 120a through 120d that belong to the same trust level grouping of groupings 128 through 134 are considered safe and allowed to occur. Furthermore, these communications do not result in security tool 102 changing the trust level grouping of any of the involved applications. In embodiments in which trust level groupings 128, 130, and 134 are further subdivided into tiers, as illustrated in FIG. 1B, when a communication of communications 136a through 136d occurs between applications belonging to different tiers within the same trust level grouping of groupings 128 through 134 (e.g., first tier 128a and third tier 128c), security tool 102 may reassign the application belonging to the higher tier to a lower tier based on, for example, the consequence of such communication as well as the frequency of such communications, as indicated in communication log 114.

(2) Any communications 136a through 136d that occur between an application of applications 120a through 120d that belong to malicious grouping 132 and any applications 120a through 120d that belong to any of trusted grouping 128, untrusted grouping 130, and/or unverified grouping 134 are considered unsafe. In certain embodiments, such communications are blocked. In some embodiments, security tool 102 generates an alert 140 in response to detecting such communications. In certain embodiments, if a communication of communications 136a through 136d occurs between an application that belongs to either trusted grouping 128 or unverified grouping 134 and an application that belongs to malicious grouping 132, security tool 102 reassigns the application belonging to trusted grouping 128 or unverified grouping 134 to untrusted grouping 132. In some embodiments in which untrusted grouping 130 is further subdivided into tiers, as illustrated in FIG. 1B, if a communication of communications 136a through 136d occurs between an application that belongs to untrusted grouping 130 and an application that belongs to malicious grouping 132, the application that belongs to the untrusted grouping 130 may be reassigned to a lower tier within untrusted grouping 130 (e.g., from tier 130a to tier 130b) or reassigned to malicious grouping 132.

(3) Any communications 136a through 136d that occur between an application of applications 120a through 120d that belong to trusted grouping 128 and an application of applications 120a through 120d that belong to unverified grouping 134 are allowed but result in security tool 102 generating a warning 140. In some embodiments, security tool 102 may determine, based on communication patterns present in communication log 114, to increase the trust level of the application assigned to unverified grouping 134 (e.g., assign the application to a higher tier within unverified grouping 134 or reassign the application to trusted grouping 128).

Figure 2A:
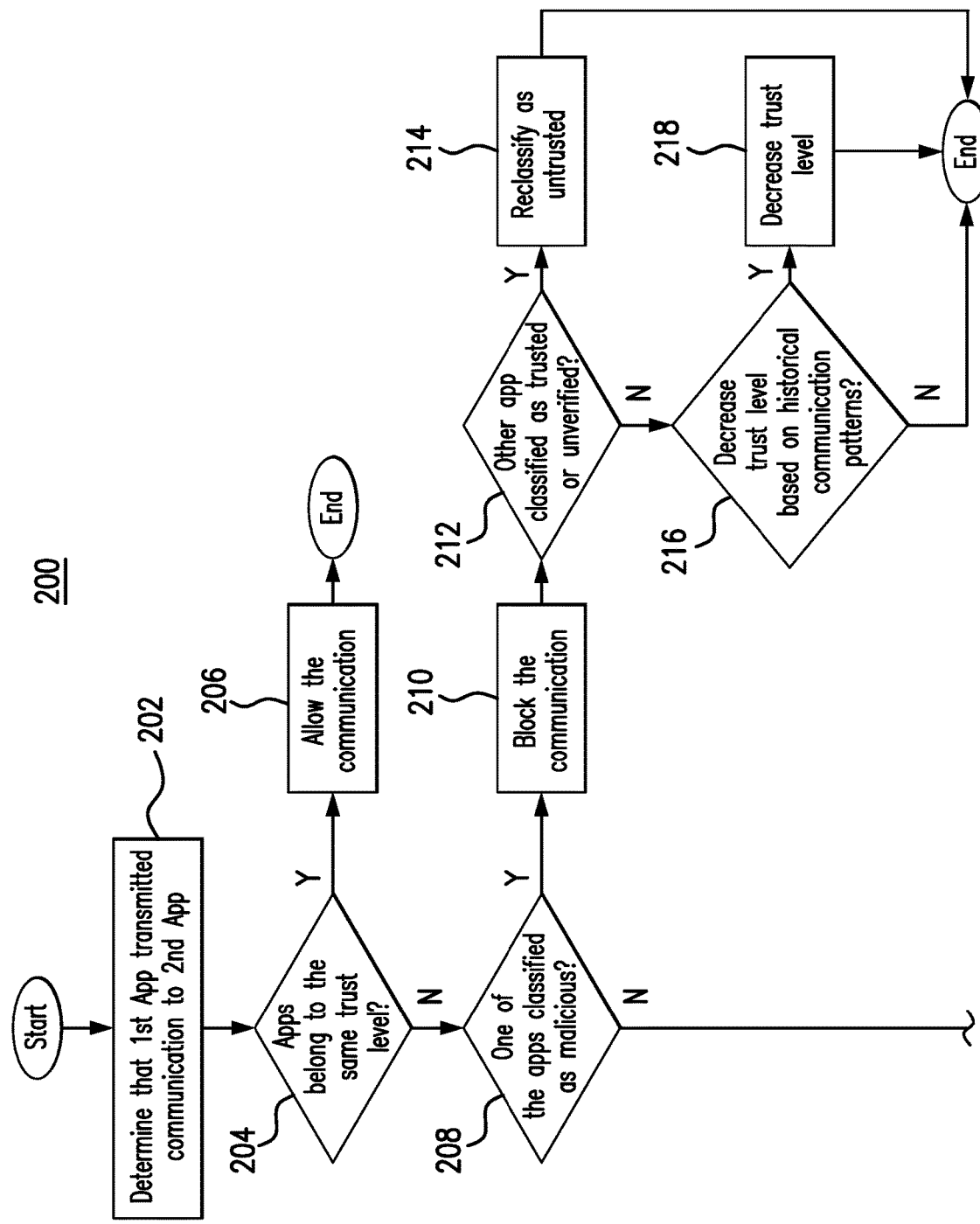
FIGS. 2A and 2B present a flowchart illustrating an example method by which the network security tool of the system of FIG. 1A may evaluate the trustworthiness of communications transmitted within the system.
Figure 2B:
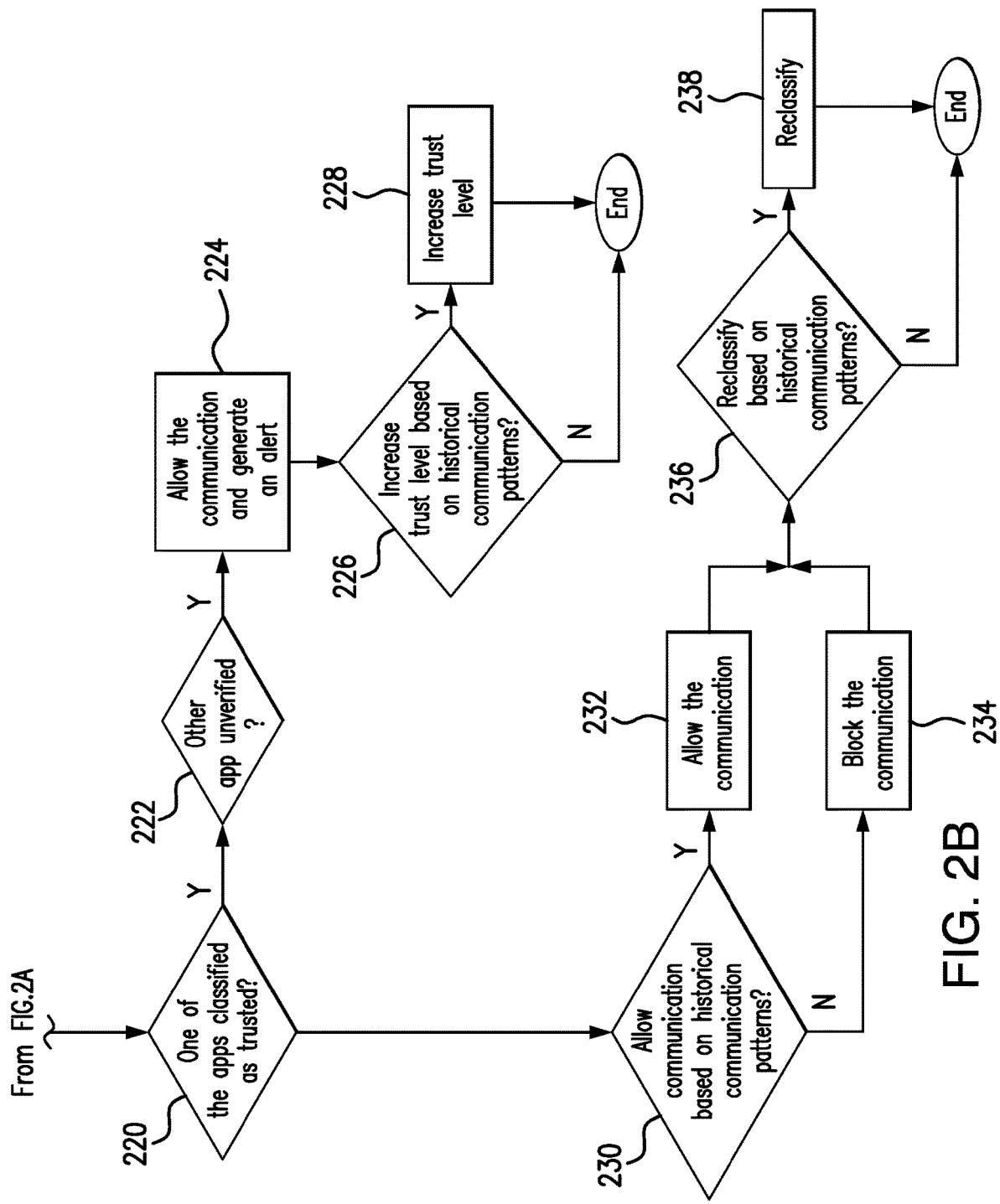

FIGS. 2A and 2B present a flowchart (described in conjunction with elements of FIGS. 1A and 1B) illustrating an example method 200 by which security tool 102 may apply the above-described rules, along with RNN 126, to evaluate communications 136a through 136d transmitted within system 100 and to adjust the trust level groupings 128 through 134 assigned to applications 120a through 120d based on the communications transmitted by these applications.

In step 202, security tool 102 determines that a first application 120a has transmitted a communication 136a to a second application 120b. Security tool 102 also identifies the trust level grouping of groupings 128 through 134 assigned to each application. If either application has not yet been assigned to a trust level grouping, security tool 102 assigns the application to unverified grouping 134. In step 204 security tool 102 determines whether or not first application 120a and second application 120b belong to the same trust level grouping of groupings 128 through 134. If, in step 204 security tool 102 determines that first application 120a and second application 120b belong to the same trust level grouping of groupings 128 through 134, in step 206 security tool 102 allows communication 136a and stores information 138 about the communication in communication log 114. In certain embodiments in which trust level groupings 128, 130, and 134 are further subdivided into tiers, as illustrated in FIG. 1B, and first application 120a and second application 120b do not belong to the same tier, security tool 102 may additionally apply RNN 126 to communication log 114 to determine whether or not to reassign the application at the higher trust level tier to a lower trust level tier.

If, in step 204 security tool 102 determines that first application 120a and second application 120 do not belong to the same trust level grouping of groupings 128 through 134, in step 208 security tool 102 determines whether one of the applications belongs to malicious grouping 132. If, in step 208 security tool 102 determines that one of the applications belongs to malicious grouping 132, in step 210 security tool 102 blocks the communication and stores information 138 about the communication in communication log 114. In step 212 security tool 102 determines whether the other application belongs to either trusted grouping 128 or unverified grouping 134. If, in step 212 security tool 102 determines that the other application belongs to either trusted grouping 128 or unverified grouping 134, in step 214 security tool 102 reassigns this other application to untrusted grouping 130. If, in step 212 security tool 102 determines that the other application belongs to untrusted grouping 130, in step 216 security tool 102 determines whether or not to decrease the trust level of this application. For example, security tool 102 may determine whether or not to reassign the application to a lower tier 130b through 130d of untrusted grouping 130, or to reassign the application to malicious grouping 132. Security tool 102 may determine whether or not to reassign the application to a lower trust level based on historical patterns of communication present in communication log 114, as identified by RNN 126. If, in step 216 security tool 102 determines to reassign the other application to a lower trust level, in step 218 security tool 102 performs this reassignment. For example, if the application belongs to first tier 130a of untrusted grouping 130, security tool 102 may assign the application to second tier 130b. As another example, security tool 102 may reassign the application to malicious grouping 132.

If, in step 208 security tool 102 determines that neither first application 120a nor second application 120b belongs to malicious grouping 132, in step 220 security tool 102 determines whether one of the applications belongs to trusted grouping 128. If, in step 220 security tool 102 determines that one of the applications belongs to trusted grouping 128, in step 222 security tool 102 determines whether the other application belongs to unverified grouping 134. If, in step 222 security tool 102 determines that the other application belongs to unverified grouping 134, in step 224 security tool 102 allows communication 136a, logs communication 136a in communication log 114, and generates alert 140. Alert 140 is used to warn user 104 that communication 136a occurred between a trusted application and an application that has not yet been verified as not malicious. In step 226 security tool 102 determines whether or not to increase the trust level of the application assigned to unverified grouping 134. For example, security tool 102 may apply RNN 126 to communication log 114 to determine whether or not to reassign the application assigned to unverified grouping 134 to either (1) a higher tier within unverified grouping 134, or (2) trusted grouping 128. If, in step 226 security tool 102 determines to increase the trust level of the application assigned to unverified grouping 134, in step 228 security tool 102 performs this reassignment.

If, in step 220 security tool 102 determines that neither first application 120a nor second application 120b are assigned to trusted grouping 128, in step 230 security tool 102 determines whether or not to allow communication 136a, based on historical patterns of communication in communication log 114. For example, security tool 102 applies RNN 126 to communication log 114 to determine whether or not to allow communication 136a. If, in step 230 security tool 102 determines to allow communication 136a, in step 232 security tool 102 allows the communication and logs information 140 in communication log 114, indicating that communication 136a occurred. If, in step 230 security tool 102 determines not to allow communication 136a, in step 234 security tool 102 blocks the communication and logs information 140 in communication log 114, indicating that communication 136a was attempted but not completed. In step 236 security tool 102 determines whether or not to reclassify first application 120a or second application 120b, based on historical patterns of communication in present in communication log 114. For example, security tool 102 applies RNN 126 to communication log 114 to determine whether or not to reclassify first application 120a and/or second application 120b. If, in step 236 security tool 102 determines to reclassify first application 120a and/or second application 120b, in step 238 security tool 102 performs this reclassification.

Modifications, additions, or omissions may be made to method 200 depicted in FIGS. 2A and 2B. Method 200 may include more, fewer, or other steps. For example, steps may be performed in parallel or in any suitable order. While discussed as security tool 102 (or components thereof) performing the steps, any suitable component of system 100, such as device(s) 106, and/or subsystems 110a through 110d, for example, may perform one or more steps of the method.

Figure 3:
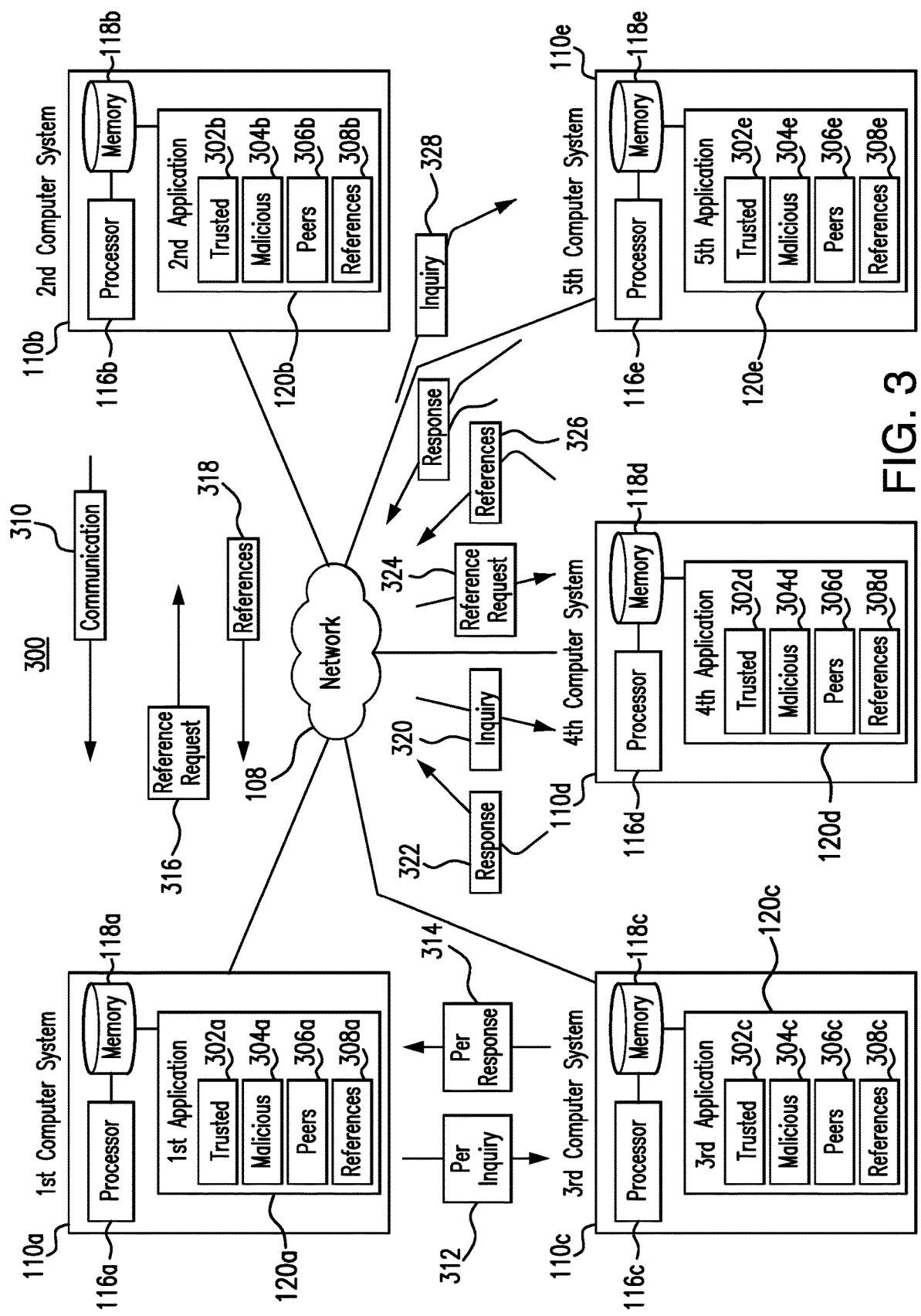
FIG. 3 illustrates an example network security system that relies on cooperation between applications installed in the system to monitor for and protect against malicious communications transmitted to subsystems located on an internal network.

II. Peer-Based Cooperation for Identifying and Blocking Malicious Communications a. System Overview As described above, in certain embodiments, in addition to, or instead of the use of a centralized security tool 102, each application may be configured to maintain its own local lists of trusted, untrusted, and/or malicious application, and to use these local lists to evaluate the communication requests it receives from other applications. FIG. 3 presents an example system 300 in which applications 120a through 120e are configured to perform such evaluations. As can be seen by a comparison between system 100 presented in FIG. 1A and system 300 presented in FIG. 3, system 300 includes many of the same components as system 100—namely subsystems 110, processors 116, memories 118, and network 108. Accordingly, in the discussion that follows, it is assumed that the features and functions of these shared components include any of those features/functions presented in the discussion of FIG. 1A, presented above.

As illustrated in FIG. 3, each application 120a through 120e stores a set of lists. For example, first application 120a stores a list of trusted applications 302a, a list of malicious applications 304a, a list of peer applications 306a, and a list of reference applications 308a. Similarly, second application 120b stores a list of trusted applications 302b, a list of malicious application 304b, a list of peer applications 306b, and a list of reference applications 308b; third application 120c stores a list of trusted applications 302c, a list of malicious applications 304c, a list of peer applications 306c, and a list of reference applications 308c; fourth application 120d stores a list of trusted applications 302d, a list of malicious applications 304d, a list of peer applications 306d, and a list of reference applications 308d; and fifth application 120e stores a list of trusted applications 302e, a list of malicious applications 304e, a list of peer applications 306e, and a list of reference applications 308e. Each list of trusted applications 302a through 302e stored by a given application of applications 120a through 120e identifies those applications within system 300 that the given application trusts and will freely communicate with. For example, if first application 120a includes second application 120b in its list of trusted applications 302a, then in response to receiving a request for communication 310 from second application 120b, first application 120a will allow this communication. On the other hand, each list of malicious applications 304a through 304e stored by a given application of applications 120a through 120e identifies those applications within system 300 that the given application knows are malicious and will not communicate with. For example, if first application 120a includes second application 120b in its list of malicious applications 304a, then in response to receiving a request for communication 310 from second application 120b, first application 120a will block the communication. In certain embodiments, each application 120a through 120e may obtain its corresponding lists of trusted applications 302a through 302e and malicious applications 304a through 304e from trusted grouping 128 and malicious grouping 132 stored by security tool 102, illustrated in FIG. 1A.

While FIG. 3 illustrates five applications 120a through 120e, network 108 may include any number of applications 120a through 120e. Accordingly, in certain embodiments (e.g., embodiments in which there may be millions of applications 120a through 120e located within network 108), trusted lists 302a through 302e may not include all of the trusted applications identified in system 300 (e.g., all of the applications included in trusted grouping 128). Similarly, malicious lists 304a through 304e may not include all of the applications that have been identified as malicious (e.g., all of the applications included in malicious grouping 132). Rather, in order to conserve memory resources, each application 120a through 120e may store only those applications with which it receives the most frequent communication requests within its corresponding trusted list of lists 302a through 302e and malicious list of lists 304a through 304e. Accordingly, in order to enable each application 120a through 120e to evaluate communications 310 originating from applications that are not included in its locally maintained trusted and malicious lists, each application 120a through 120e may also store a list of peer applications with which to consult when receiving communication requests from unknown applications. For example, first application 120a may store a list of peer applications 306a, second application 120b may store a list of peer applications 306b, third application 120c may store a list of peer applications 306c, fourth application 120d may store a list of peer applications 306d, and fifth application 120e may store a list of peer applications 306e. In certain embodiments, each list of peer applications 306a through 306e is a subset of the corresponding list of trusted applications 302a through 302e. In response to receiving a communication request 310 from an application not included in either its list of trusted applications or its list of malicious applications, a given application may transmit a request 312 to the applications included in its list of peer applications requesting information about the unknown application. For example, in response to receiving a communication request 310 from second application 120b, first application 120a may determine that second application 120b is not included in either trusted list 302a or malicious list 304a. Accordingly, first application 120a may consult its list of peer applications 306a, determine that third application 120c is included in peer list 306a, and transmit a request 312 to third application 120c requesting information about second application 120b. If first application 120a receives a response 314 from third application 120c indicating that third application 120c has included second application 120b in its list of trusted applications 302c, first application 120a may allow the requested communication 310. On the other hand, if first application 120a receives a response 314 from third application 120c indicating that third application 120c has included second application 120b in its list of malicious applications 304c, first application 120a may assume that second application 120b is malicious, and block the requested communication.

In certain embodiments, none of the applications included in peer list 306a may have any information about second application 120b. To address such situations, each application 120a through 120e may also store a list of reference applications 308a through 308e. For example, first application 120a may store reference list 308a, second application 120b may store reference list 308b, third application 120c may store reference list 308c, fourth application 120d may store reference list 308d, and fifth application 120e may store reference list 308e. When a given application of applications 120a through 120e receives a communication request 310 from an application that is not included in any of its peer application's trusted or malicious lists, it may request that application's list of references and use this list to determine whether or not to allow the requested communication. For example, in response to determining that none of the applications included in peer list 306a have any information about second application 120b, first application 120a may send a message 316 to second application 120b requesting second application 120b's reference list 308b. Second application 120b may transmit its reference list 308b to first application 120a in response 318. First application 120a may then cross-reference the applications listed in reference list 308b with the applications listed in trusted list 302a. If any applications are included in both lists, first application 120a may send messages to those applications, requesting information about second application 120b. For example, if first application 120a determines that fourth application 120d is included in both reference list 308b and trusted list 302a, first application 120a may transmit a message 320 to fourth application 120d requesting information about second application 120b. If first application 120a receives a response 322 from fourth application 120d indicating that fourth application 120d has included second application 120b in its list of trusted applications 302d, first application 120a may allow the requested communication 310. On the other hand, if first application 120a receives a response 322 from fourth application 120d indicating that fourth application 120d has included second application 120b in its list of malicious applications 304d, first application 120a may assume that second application 120b is malicious, and block the requested communication. Further details of the manner by which applications 120a through 120e may cooperate with one another to protect system 300 from malicious communications are presented below, in the discussion of FIGS. 4A and 4B.

b. Method for Peer-Based Identification of Malicious Communications

Figure 4A:
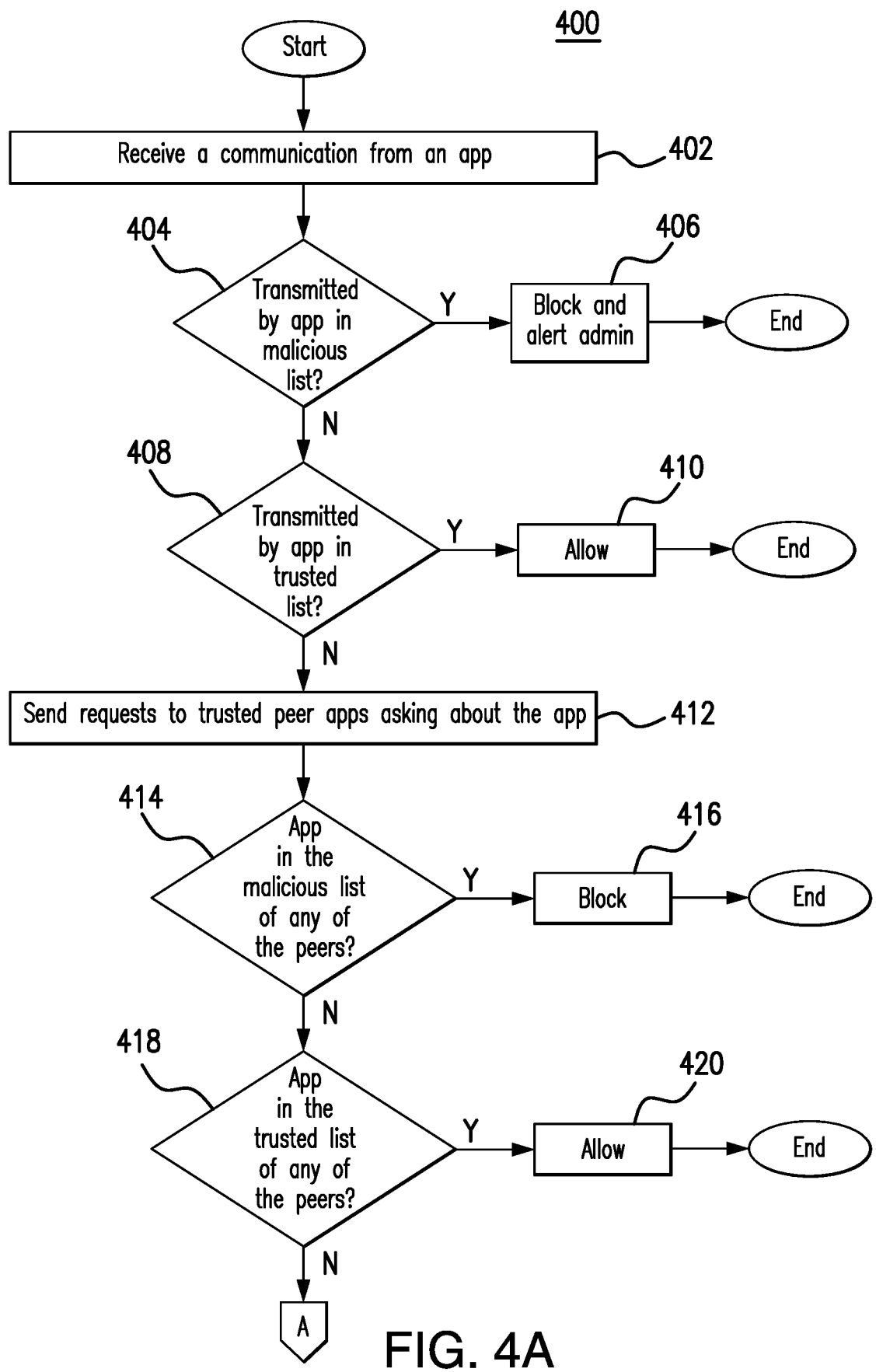
FIGS. 4A and 4B present a flowchart illustrating an example method by which applications installed in the network security system of FIG. 3 may cooperate with one another to identify and block malicious communications.
Figure 4B:
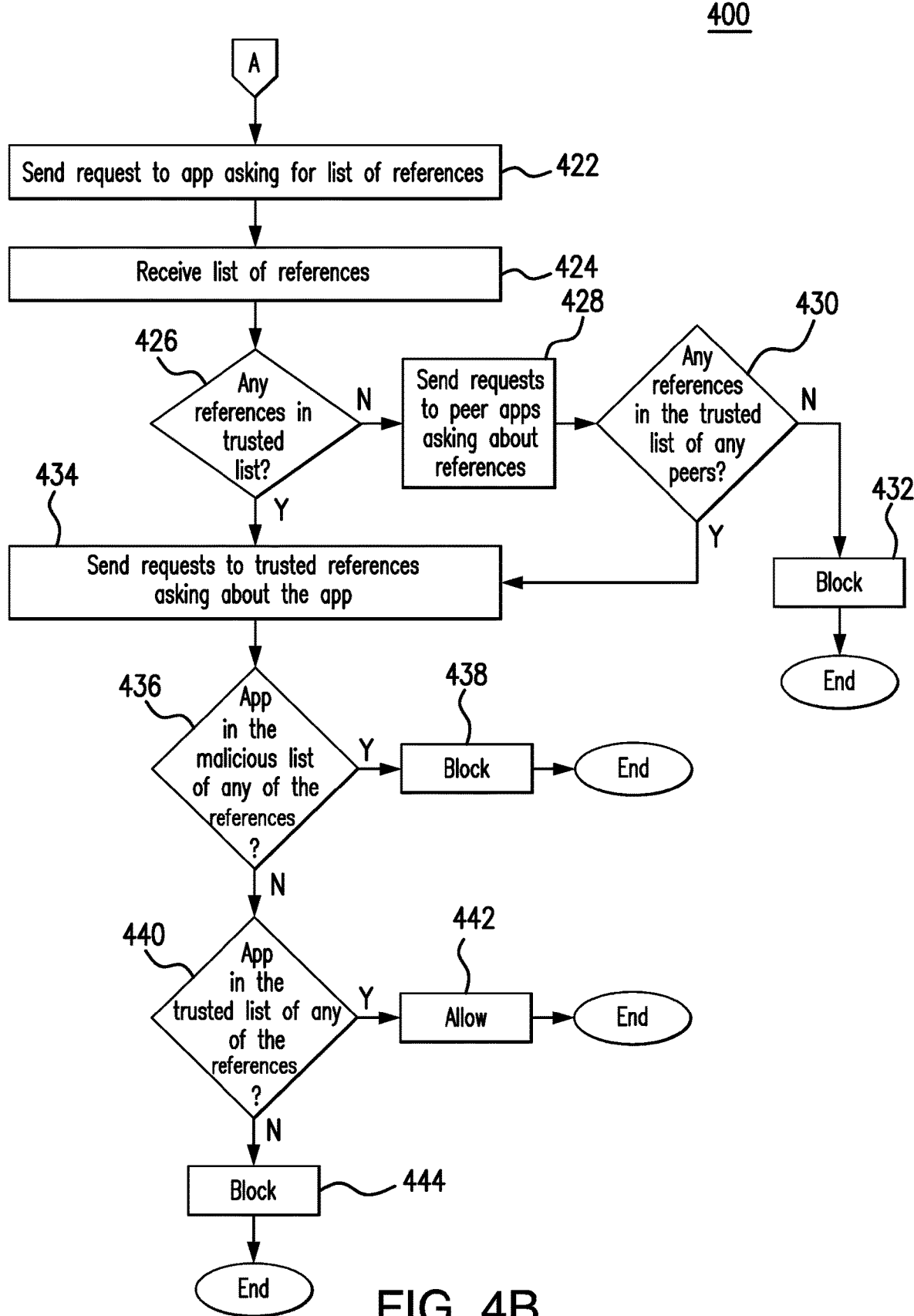

FIGS. 4A and 4B present a flowchart (described in conjunction with elements of FIG. 3) illustrating an example method 400 by which applications 120a through 120e may cooperate with one another to identify and block malicious communications.

In step 402 first application 120a receives a communication request 310 from second application 120b. In step 404 first application 120a determines whether or not second application 120b is included in malicious list 304a. If, in step 404 first application 120a determines that second application 120b is included in malicious list 304a, in step 406 first applications 120a blocks communication request 310. In certain embodiments, first application 120a may also alert an administrator 104 to the attempted communication. If, in step 404 first application 120a determines that second application 120b is not included in malicious list 304a, in step 408 first application 120a determines whether or not second application 120b is included in trusted list 302a. If, in step 408 first application 120a determines that second application 120b is included in trusted list 302a, in step 410 first application 120a allows the requested communication 310.

If, in step 408 first application 120a determines that second application 120b is not included in trusted list 302a, in step 412 first application 120a transmits a message 312 to each application included in peer list 306a, requesting information about second application 120b. For example, first application 120a determines that third application 120c is included in peer list 306a and transmits message 312 to third application 120c requesting information about second application 120b. First application 120a then receives responses 314 from the applications listed in peer list 306a. For example, first application 120a receives response 314 from third application 120c. In step 414 first application 120a determines whether any of the received responses 314 indicate that second application 120b is malicious. For example, first application 120a determines whether response 314 received from third application 120c indicates that second application is included in third application 120c's malicious list 304c. If, in step 414 first application 120a determines that one or more received responses 314 indicate that second application 120b is malicious, in step 416 first application 120a blocks the request communication 310. In certain embodiments, first application 120a may also add second application 120b to its list of malicious applications 304a. If, in step 414 first application 120a determines that none of the received responses 314 indicate that second application 120b is malicious, in step 418 first application 120a determines whether any of the received responses 314 indicate that second application 120b is trustworthy. For example, first application 120a determines whether response 314 received from third application 120c indicates that second application is included in third application 120c's trusted list 302c. If, in step 418 first application 120a determines that one or more of the received responses 314 indicate that second application 120b is trustworthy, in step 410 first application 120a allows the requested communication 310. In certain embodiments, first application 120a may also add second application 120b to its list of trusted applications 302a.

If, in step 418 first application 120a determines that none of the received responses 314 indicate that second application 120b is trustworthy, in step 422 first application 120a sends a message 316 to second application 120b, requesting second application 120b's list of references 308b. In step 424 first application 120a receives a response 318 from second application 120b that includes second application 120b's list of references 308b. In step 426 first application 120a cross-references second application 120b's list of references 308b with first application 120a's list of trusted applications 302a and determines whether any of second application 120b's list of references 308b are included in trusted list 302a. If, in step 426 first application 120a determines that one or more of the references listed in second application 120b's list of references 308b are included in trusted list 302a, in step 434 first application 120a sends messages 320 to these references requesting information about second application 120b.

If, in step 426 first application 120a determines that none of the references listed in second application 120b's list of references 308b are included in trusted list 302a, in step 428 first application 120a transmits messages 312 to the applications included in peer list 306a requesting information about the applications included in second application 120b's list of references 308b. In step 430 first application 120a receives responses 314 back from the applications included in peer list 306a and determines whether any of these responses indicate that one or more of the applications included in second application 120b's list of references 308b are trusted by any of the peer applications. If, in step 430 first application 120a receives one or more responses 314 back from the applications included in peer list 306a that indicate that one or more of the applications included in second application 120b's list of references 308b are trusted, method 400 proceeds to step 434 where first application 120a sends messages 320 to these trusted references requesting information about second application 120b.

If, in step 430 first application 120a does not receive any responses 314 indicating that at least one of the applications included in second application 120b's list of references 308b is included in the trust list of any of the applications included in first application 120a's peer list 306a, in certain embodiments, in step 432 first application 120a blocks the requested communication. In some embodiments, if, in step 430 first application 120a does not receive any responses 314 indicating that at least one of the applications included in second application 120b's list of references 308b is included in the trust list of any of the applications included in first application 120a's peer list 306a, first application 120a next sends messages 324 to the applications included in second application 120b's list of references 308b, requesting their own lists of references. For example, if fourth application 120d is included in second application 120b's list of references 308b, first application 120a sends message 324 to fourth application 120d requesting fourth application 120d's list of references 308d. In response to receiving responses 326 that include the requested lists of references, method 400 returns to step 428, where first application 120a sends requests 312 to the applications included in its list of peer applications 306a inquiring about these references. If any of the references are identified as trustworthy by the applications included in the list of peer applications 306a, first application 120a sends requests 328 to these references, inquiring about second application 120*b*. This process may repeat recursively any number of times.

In step 436, after transmitting requests 312/328 to any of second application 120*b*'s references 308*b* that have been identified as trustworthy, first application 120*a* receives responses 314/330 and determines whether any of these responses indicate that second application 120*b* is malicious (e.g., included in malicious list 304*c*/304*e*). If, in step 436 first application 120*a* determines that it has received one or more responses indicating that second application 120*b* is malicious, in step 438 first application 120*a* blocks the requested communication 310. In some embodiments, first application 120*a* also adds second application 120*b* to malicious list 304*a*. If, in step 436 first application 120*a* does not receive any responses indicating that second application 120*b* is malicious, in step 440 first application 120*a* determines whether any of the received responses indicate that second application 120*b* is trustworthy (e.g., included in trusted list 302*c*/302*e*). If, in step 440 first application 120*a* determines that it has received one or more responses indicating that second application 120*b* is trustworthy, in step 442 first application 120*a* allows the requested communication 310. In certain embodiments, first application 120*a* also add second application 120*b* to trusted list 302*a*. If, in step 440 first application 120*a* determines that it has not received any responses indicating that second application 120*b* is trustworthy, in step 444 first application 120*a* blocks the requested communication.

Modifications, additions, or omissions may be made to method 400 depicted in FIGS. 4A and 4B. Method 400 may include more, fewer, or other steps. For example, steps may be performed in parallel or in any suitable order. While discussed as first application 120*a* (or components thereof) performing the steps, any suitable component of system 300, such as subsystems 110*a* through 110*e*, or applications 120*b* through 120*e*, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store:
a first list of applications comprising a first application; and
a second list of applications comprising a second application, wherein:
each application of the first list of applications is assigned to a first trust level of a set of trust levels, the assignment of the application to the first trust level indicating that the application is a trusted application having a probability that the application is malicious less than a lower threshold;
each application of the second list of applications is assigned to a second trust level of the set of trust levels, the assignment of the application to the second trust level indicating that the application is an untrusted application or a malicious application having a probability that the application is malicious greater than the lower threshold; and
each application of the first list of applications and the second list of applications belongs to a set of applications, wherein each application of the set of applications is installed on a computer system of a set of computer systems, each computer system of the set of computer systems located on a network; and
a communication log comprising information identifying communications that have occurred over the network; and
a hardware processor communicatively coupled to the memory, the hardware processor configured to:
determine that the second application transmitted a communication destined for the first application;
determine that the first application and the second application are assigned to different trust levels of the set of trust levels; and
in response to determining that the first application and the second application are assigned to different trust levels, and prior to the communication destined for the first application reaching the computer system of the first application:
detect that the second application is a malicious application with a probability of being a malicious application greater than an upper threshold;
determine, based on detecting that the second application is a malicious application, that a probability that the communication destined for the first application is malicious is greater than a threshold;
in response to determining that the probability that the communication destined for the first application is malicious is greater than the threshold, prevent the communication destined for the first application from reaching the computer system of the first application; and
reclassify, based on detecting that the second application is a malicious application, the first application as an untrusted application with a probability of being a malicious application between the lower threshold and an upper threshold.

2. The apparatus of claim 1, wherein:
a malicious application is at least one of:
an application that is infected with malware; and
an application that is instructed to perform tasks by another application that is infected by malware; and
a malicious communication is a communication comprising at least one of:
malware; and
a phishing attempt.

3. The apparatus of claim 1, wherein the hardware processor is further configured to:
determine that a third application of the set of applications transmitted a communication destined for a fourth application of the set of applications;
determine that both the third application and the fourth application are assigned to a given trust level of the set of trust levels; and
in response to determining that both the third application and the fourth application are assigned to the given trust level, allow the communication destined for the fourth application to reach the computer system of the fourth application.

4. The apparatus of claim 1, wherein:
for each application of the second list of applications, the assignment of the application to the second trust level indicates that the probability that the application is malicious is between the lower threshold and an upper threshold;
the memory is further configured to store:

a third list of applications, wherein each application of the third list of applications is assigned to a third trust level of the set of trust levels, the assignment of the application to the third trust level indicating that a probability that the application is malicious is greater than the upper threshold; and a fourth list of applications comprising a third application, wherein each application of the fourth list of applications has not yet been assigned to any of the first trust level, the second trust level, and the third trust level; and the hardware processor is further configured to:
determine that the third application transmitted a communication destined for the first application;
determine that the third application is listed in the fourth list of applications; and
in response to determining that the third application is listed in the fourth list of applications:
allow the communication transmitted by the third application and destined for the first application to reach the computer system of the first application;
generate an alert associated with the communication transmitted by the third application and destined for the first application; and
store, in the communication log, information indicating that the third application transmitted the communication destined for the first application.

5. The apparatus of claim 4, wherein the hardware processor is further configured to:
receive information indicating that the communication transmitted by the third application and destined for the first application was not malicious and store the information in the communication log;
determine, based at least in part on the communications identified in the communication log, that a probability that the third application is malicious is less than the lower threshold; and
in response to determining that the probability that the third application is malicious is less than the lower threshold, move the third application from the fourth list to the first list.

6. The apparatus of claim 1, wherein determining that the probability that the communication destined for the first application is malicious is greater than the threshold comprises applying a recurrent neural network.

7. A method comprising:
determining that a second application transmitted a communication destined for a first application, wherein:
the first application belongs to a first list of applications that is assigned to a first trust level of a set of trust levels, the assignment of each application of the first list of applications to the first trust level indicating that the application is a trusted application having a probability that the application is malicious less than a lower threshold;
the second application belongs to a second list of applications that is assigned to a second trust level of the set of trust levels, the assignment of each application of the second list of applications to the second trust level indicating that the application is an untrusted application or a malicious application having a probability that the application is malicious greater than the lower threshold;
determining that the first application and the second application are assigned to different trust levels of the set of trust levels; and in response to determining that the first application and the second application are assigned to different trust levels, and prior to the communication destined for the first application reaching a computer system on which the first application is installed:
detecting that the second application is a malicious application with a probability of being a malicious application greater than an upper threshold;
determining, based on detecting that the second application is a malicious application, that a probability that the communication destined for the first application is malicious is greater than a threshold;
in response to determining that the probability that the communication destined for the first application is malicious is greater than the threshold, preventing the communication destined for the first application from reaching the computer system on which the first application is installed;
reclassifying, based on detecting that the second application is a malicious application, the first application as an untrusted application with a probability of being a malicious application between the lower threshold and an upper threshold.

8. The method of claim 7, wherein:
a malicious application is at least one of:
an application that is infected with malware; and
an application that is instructed to perform tasks by another application that is infected by malware; and
a malicious communication is a communication comprising at least one of:
malware; and
a phishing attempt.

9. The method of claim 7, further comprising:
determining that a third application transmitted a communication destined for a fourth application;
determining that both the third application and the fourth application are assigned to a given trust level of the set of trust levels; and
in response to determining that both the third application and the fourth application are assigned to the given trust level, allowing the communication destined for the fourth application to reach a computer system on which the fourth application is installed.

10. The method of claim 7, wherein:
the assignment of the second application to the second trust level further indicates that the probability that the second application is malicious is less than an upper threshold; and
the method further comprises:
determining that a third application transmitted a communication destined for the first application, wherein the third application is assigned to a third trust level of the set of trust levels, the assignment of the third application to the third trust level indicating that the third application has not yet been assigned to any of the first trust level, the second trust level, and a fourth trust level, wherein an assignment of an application to the fourth trust indicates that a probability that the application is malicious that is greater than the upper threshold
determining that the third application is listed in the third list of applications; and
in response to determining that the third application is listed in the third list of applications:

allowing the communication transmitted by the third application and destined for the first application to reach the computer system on which the first application is installed;

generating an alert associated with the communication transmitted by the third application and destined for the first application; and storing, in the communication log, information indicating that the third application transmitted the communication destined for the first application.

11. The apparatus of claim 10, further comprising:
receiving information indicating that the communication transmitted by the third application and destined for the first application was not malicious and storing the information in the communication log;

determining, based at least in part on the communications identified in the communication log, that a probability that the third application is malicious is less than the lower threshold; and in response to determining that the probability that the third application is malicious is less than the lower threshold, reassigning the third application from the third trust level to the first trust level.

12. The method of claim 7, wherein determining that the probability that the communication destined for the first application is malicious is greater than the threshold comprises applying a recurrent neural network.

13. A system comprising:
a first computer system on which a first application is installed, the first computer system located on a network;

a second computer system on which a second application is installed, the second computer system located on the network;

a memory configured to store:
a first list of applications comprising the first application, wherein each application of the first list of applications is assigned to a first trust level of a set of trust levels, the assignment of the application to the first trust level indicating that the application is a trusted application having a probability that the application is malicious less than a lower threshold; and a second list of applications comprising the second application, wherein each application of the second list of applications is assigned to a second trust level of the set of trust levels, the assignment of the application to the second trust level indicating that the application is an untrusted application or a malicious application having a probability that the application is malicious greater than the lower threshold; and a communication log comprising information identifying communications that have occurred over the network; and a hardware processor communicatively coupled to the memory, the hardware processor configured to:
determine that the second application transmitted a communication destined for the first application;

determine that the first application and the second application are assigned to different trust levels of the set of trust levels; and in response to determining that the first application and the second application are assigned to different trust levels, and prior to the communication destined for the first application reaching the first computer system:

detect that the second application is a malicious application with a probability of being a malicious application greater than an upper threshold;

determine, based on detecting that the second application is a malicious application, that a probability that the communication destined for the first application is malicious is greater than a threshold;

in response to determining that the probability that the communication destined for the first application is malicious is greater than the threshold, prevent the communication destined for the first application from reaching the first computer system; and reclassify, based on detecting that the second application is a malicious application, the first application as an untrusted application with a probability of being a malicious application between the lower threshold and an upper threshold.

14. The system of claim 13, wherein:
a malicious application is at least one of:
an application that is infected with malware; and
an application that is instructed to perform tasks by another application that is infected by malware; and
a malicious communication is a communication comprising at least one of:
malware; and
a phishing attempt.

15. The system of claim 13, further comprising:
a third computer system on which a third application is installed, the third computer system located on the network;

a fourth computer system on which a fourth application is installed, the fourth computer system located on the network, wherein the hardware processor is further configured to:
determine that the third application transmitted a communication destined for the fourth application;

determine that both the third application and the fourth application are assigned to a given trust level of the set of trust levels; and in response to determining that both the third application and the fourth application are assigned to the given trust level, allow the communication destined for the fourth application to reach the fourth computer system.

16. The system of claim 13, further comprising a third computer system on which a third application is installed, the third computer system located on the network, wherein:
for each application of the second list of applications, the assignment of the application to the second trust level indicates that the probability that the application is malicious is between the lower threshold and an upper threshold;

the memory is further configured to store:
a third list of applications, wherein each application of the third list of applications is assigned to a third trust level of the set of trust levels, the assignment of the application to the third trust level indicating that a probability that the application is malicious is greater than the upper threshold; and a fourth list of applications comprising the third application, wherein each application of the fourth list of applications has not yet been assigned to any of the first trust level, the second trust level, and the third trust level; and the hardware processor is further configured to:

determine that the third application transmitted a communication destined for the first application;

determine that the third application is listed in the fourth list of applications; and in response to determining that the third application is listed in the fourth list of applications:
allow the communication transmitted by the third application and destined for the first application to reach the first;

generate an alert associated with the communication transmitted by the third application and destined for the first application; and store, in the communication log, information indicating that the third application transmitted the communication destined for the first application.

17. The system of claim 16, wherein the hardware processor is further configured to:

receive information indicating that the communication transmitted by the third application and destined for the first application was not malicious and store the information in the communication log;

determine, based at least in part on the communications identified in the communication log, that a probability that the third application is malicious is less than the lower threshold; and in response to determining that the probability that the third application is malicious is less than the lower threshold, move the third application from the fourth list to the first list.

* * * * *